Figure 1:
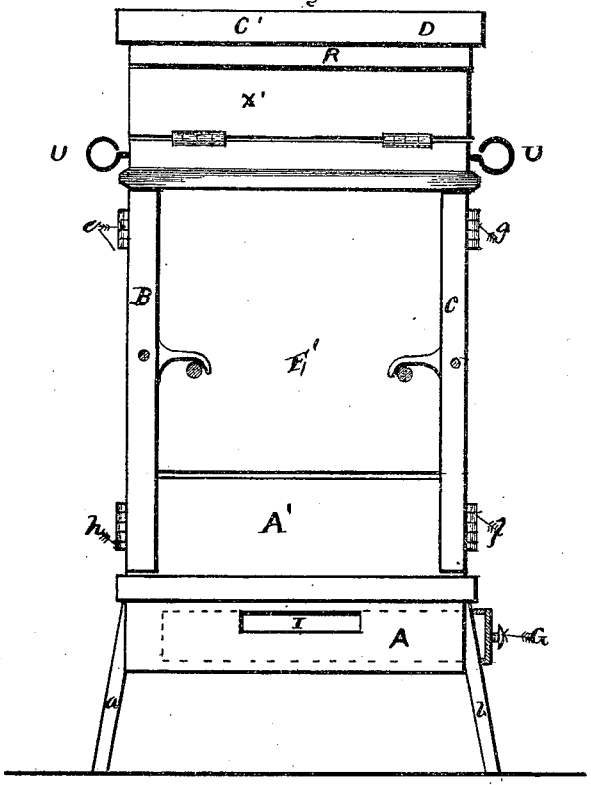
Figure 2:
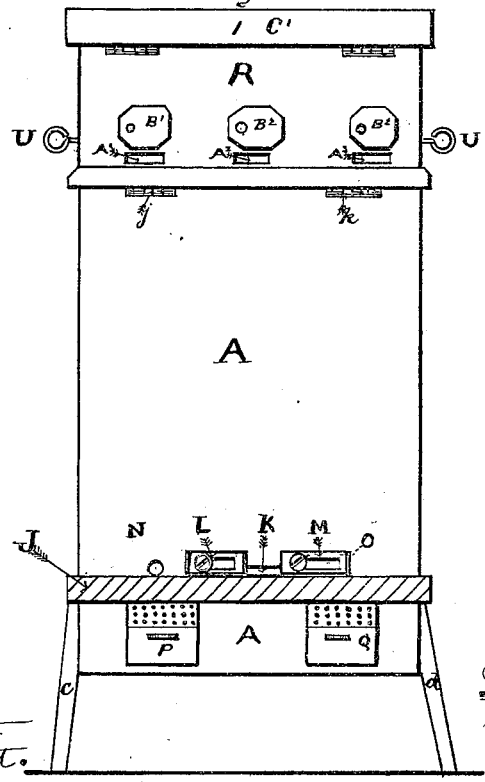
Figure 3:
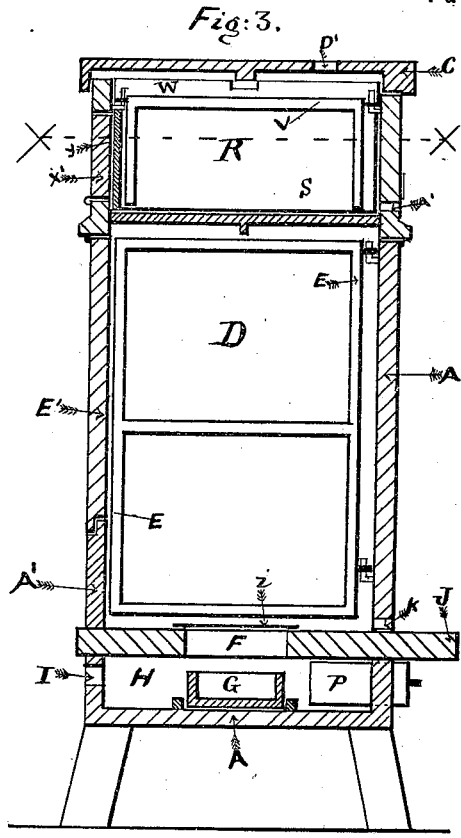
Figure 4:
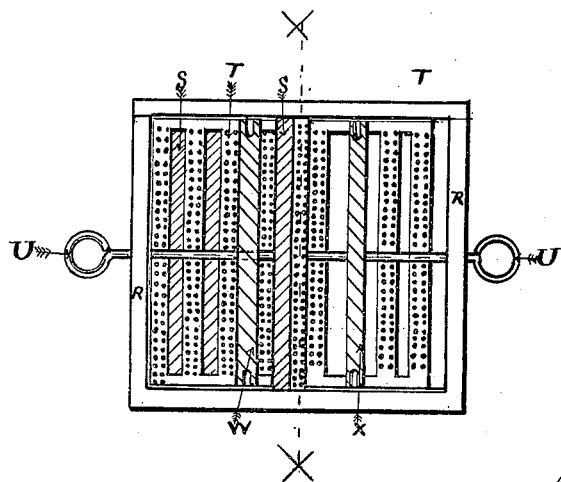

M. B. SHAW.  
No. 127,991.

Improvement in Bee-Hives.

3 Sheets--Sheet 1.

Patented June 18, 1872.

Witnesses  
Richard Gerner  
Franklin Darritt.

Inventor  
M. B. Shaw  
pr Henry Gerner  
Attorney.

M. B. SHAW.  
Improvement in Bee-Hives.  
No. 127,991.  
Patented June 18, 1872.

Witnesses  
Richard Gerner  
Franklin Barritt

Inventor.  
Morgan B. Shaw  
per Henry Gerner  
Attorney.

M. B. SHAW.
No. 127,991.
3 Sheets--Sheet 3.
Improvement in Bee-Hives.
Patented June 18, 1872.
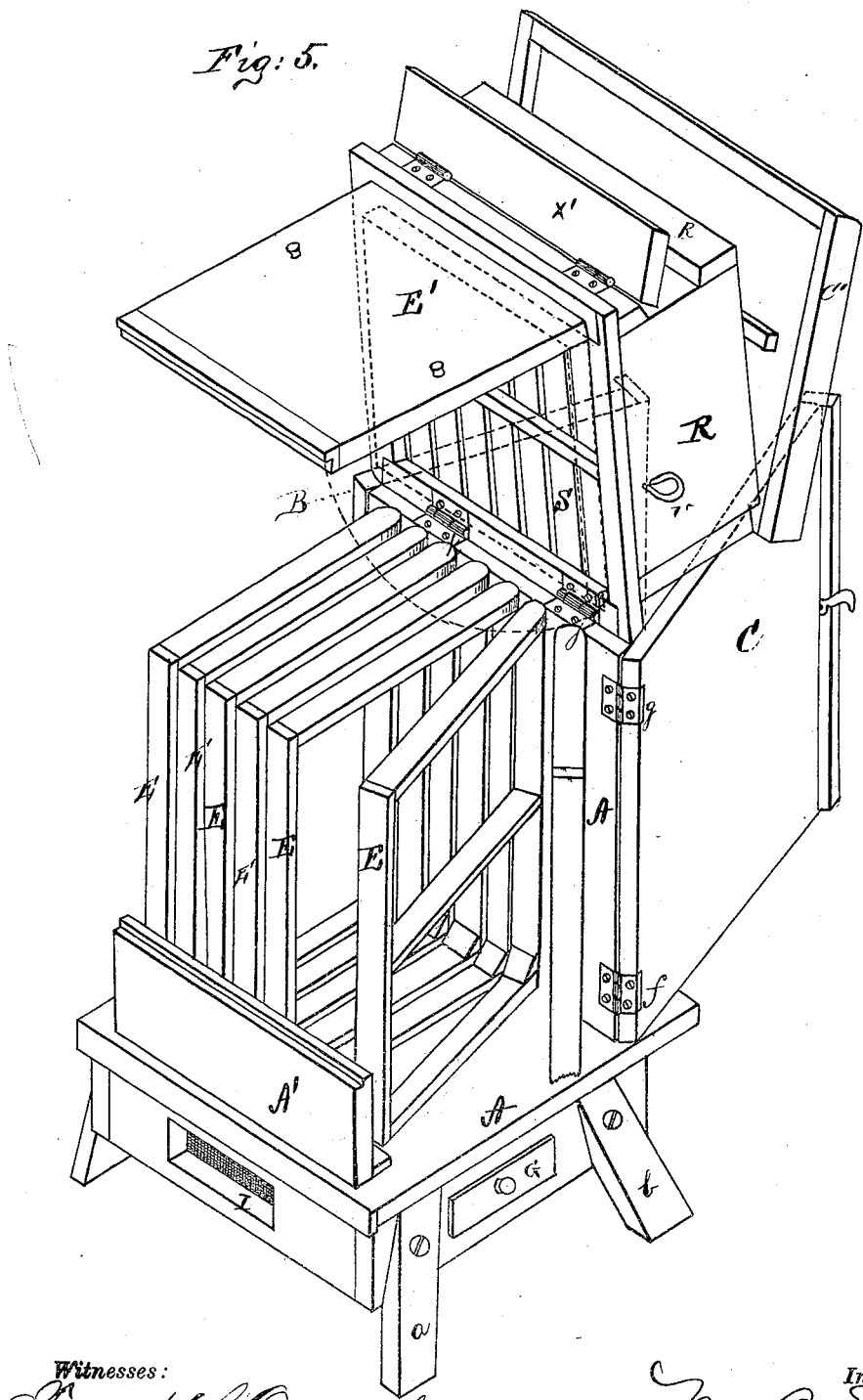
Fig: 5.
Witnesses:
Franck L. Durand
C. C. Evert
Inventor.
M. B. Shaw
per Chandler Mason
Attorneys.

127,991

UNITED STATES PATENT OFFICE.

MORGAN B. SHAW, OF ZIONSVILLE, IOWA.

IMPROVEMENT IN BEE-HIVES.

Specification forming part of Letters Patent No. 127,991, dated June 18, 1872.

Specification describing certain Improvements in Bee-Hives, invented by MORGAN B. SHAW, of Zionsville, Boone county, State of Iowa.

The object of my invention is to produce a bee-hive that will enable the breeding and keeping of bees more easily and cheaper, and also the removal of the honey without disturbing them. Heretofore the removal of the honey and comb was done by sliding drawers, these drawers having been made quite large, thereby not only making it inconvenient for the trade, but also creating a disturbance in the hive, while, on the other hand, I place light frames at proper distances from each other, that can be easily taken from the hive without the least inconvenience to the bees. In all the former bee-hives there was no protection or security for the bees from a small but destructive insect called the moth, that makes ingress to the hive during the night. I have invented means by which this insect can be instantaneously destroyed without incurring any damage to the hive.

To describe my invention more fully, I will refer to the accompanying drawing.

Figure I is a front view of a bee-hive embodying my invention. Fig. II is a back view of the same. Fig. III is a cut section through the line $x$ $x$, Fig. IV. Fig. IV is a top view with the cover removed. Fig. V represents a perspective view of the bee-hive, showing the comb-frames exposed, the doors folded backward, and the upper chamber thrown backward on its hinges and resting on the open doors.

A is the frame, supported by four legs, $a$, $b$, $c$, and $d$. B and C are two side doors, hinged on the hinges $e$, $f$, $g$, and $h$, which open into the brood-chamber D. In this brood-chamber are eight or more frames, E E, hinged loosely to the frame A of the bee-hive. As the bees deposit their honey and honey-combs upon the frames E, I have deemed it advisable to place them at sufficient distance from each other, in order to prevent the bees from waxing them together, and thereby preventing their removal. On the bottom of the brood-chamber D is an opening, F, covered with a perforation, $i$. This aperture opens directly over a sliding drawer, G, in the chamber H, under the brood-chamber D. The object of this drawer is to catch the dirt that may collect on the floor of the brood-chamber, and thus may be easily removed. For the purpose of ventilating the brood-chamber D an aperture, I, is cut into the frame A, leading into the chamber H. The air passing through this aperture finds access into the brood-chamber D through the opening F. J is a platform. Just above or on the level with this platform is a longitudinal slot or opening, K, this opening leading into the brood-chamber D, and forming an opening for the bees to enter or leave their hive. To prevent ingress to the hive during the night two sliding covers, L and M, are slid over the aperture K. These sliding covers L and M have two functions—first, to arrest the egress or ingress to the brood-chamber D during the night; secondly, to close the holes N and O, to the right and left of the opening K, from the ingress of the bees during the day-time. These holes N and O run downward into two removable drawers, P and Q. The upper part of these drawers are perforated to admit air and light. Their objects are as follows: During the night there is a small insect called the moth that crawls into the hive and destroys both the honey and the bees. It is apparent that I close the opening to the hive at night; but it is my object to destroy this destructive insect. Therefore, to accomplish this end, I have placed these two holes there, that when the moth alights upon the platform J it moves toward these holes, thinking they lead to the hive; and as these holes are inclined downward, the insect is naturally urged onward until it finds itself precipitated into the drawers underneath, which, being filled with water, soon destroys it. R is an upper chamber, fastened to the frame A by the hinges J and K. The bottom of this chamber has slats S S running crosswise, and corresponding in number with the frames E E in the brood-chamber. To prevent access from the brood-chamber D, when desired, and also to admit ventilation into the chamber R, I have placed perforated slides T T thereon, which can be, at will, moved back and forth by the handle U. V V are removable frames similar to those in the brood-chamber, loosely fastened to the side of the chamber R. W and X are partitions for the purpose of dividing the chamber R into three parts to raise queen-bees. To admit light into this chamber, an opening is cut through the side, said opening being provided with a shutter, X', hinged to the same. To prevent dust or dirt from entering this chamber a piece of glass, Y, is inserted from the inner side. A', A'', and A''' are entrances for the bees to their hive. These openings are provided with covers B', B'', and B'''. C' is a lid to the chamber R. D' is a ventilator. It will be seen that the frame of my bee-hive is composed of a base and a stationary back, A, which extends to a height equal to the height of the comb-frames E. In front of the frames E, on the base, is a short upward-extending piece, A', and hinged to the bottom of the chamber R, at the front part, is a leaf, E' E, whose length is equal to the size of the bottom of the chamber, and, when the chamber is closed, falls in front of the comb-frames, and, together with the piece A', forms a front for the hive. The hinged doors B and C form the side pieces of the hive when closed. When the doors are open and thrown back they form a rest for the chamber R, as shown in Fig. 5.

To obtain admittance into the brood-chamber D the side doors B and C are thrown back until they stand at right angles with the frame A. Then the upper chamber R is thrown back and rested upon the side doors, which, when opened, form a support. To prevent the bees in the upper chamber R from coming out, the lid E' is thrown down, thus forming a covering. When this is done it is apparent that the brood-chamber D is laid completely open. The removal and replacement of the frames E E are attended with great ease, which otherwise would not be the case. The upper chamber R is easily accessible by throwing back the lid C'.

Having thus fully described my invention, I desire to claim—

The combination, in a bee-hive, of the base and stationary back A (to which are hinged the doors B and C) and the short front piece A' with the chamber R hinged to the back piece of the hive, and provided with the depending hinged front piece E', which forms a bottom to the chamber when opened and a part of the front of the hive when closed, all substantially as set forth.

MORGAN B. SHAW.

Witnesses:
SAMUEL K. HARDY,
MELLVILL N. ALFORD.